(12) United States Patent
Ramesh et al.

(10) Patent No.: US 9,438,509 B2
(45) Date of Patent: Sep. 6, 2016

(54) DEFAULT GATEWAY REDUNDANCY SUPPORT ACROSS SPB NETWORKS

(71) Applicant: Avaya Inc., Basking Ridge, NJ (US)

(72) Inventors: Deepak Ramesh, Bangalore (IN); Luigi Simonetti, Macquarie Park (AU)

(73) Assignee: Avaya Inc., Santa Clara, CA (US)

( * ) Notice: Subject to any disclaimer, the term of this patent is extended or adjusted under 35 U.S.C. 154(b) by 93 days.

(21) Appl. No.: 13/931,762

(22) Filed: Jun. 28, 2013

(65) Prior Publication Data

US 2015/0003454 A1 Jan. 1, 2015

(51) Int. Cl.
*H04L 12/721* (2013.01)
*H04L 12/741* (2013.01)

(52) U.S. Cl.
CPC .............. *H04L 45/12* (2013.01); *H04L 45/66* (2013.01); *H04L 45/74* (2013.01)

(58) Field of Classification Search
CPC ....... H04L 12/28; H04L 12/66; H04L 12/46; H04L 2012/5618; H04L 12/4675; H04L 12/462; H04L 41/12; H04L 45/00–45/021; H04L 45/121–45/123; H04L 45/52; H04L 45/54; H04L 45/50
USPC ....... 370/225, 255, 351, 388–389, 392, 396, 370/395.31, 395.5, 400, 409; 709/222–223, 709/239
See application file for complete search history.

(56) References Cited

U.S. PATENT DOCUMENTS

| | | | | |
|---|---|---|---|---|
| 8,521,856 B2* | 8/2013 | Davis | ............... | H04L 29/12264 370/356 |
| 2005/0007951 A1* | 1/2005 | Lapuh | ................ | H04L 45/00 370/225 |
| 2010/0265956 A1* | 10/2010 | Li | ........................ | H04L 45/05 370/401 |
| 2011/0206047 A1* | 8/2011 | Donthamsetty | ..... | H04L 12/4641 370/392 |
| 2012/0063306 A1* | 3/2012 | Sultan | ............... | H04L 12/4625 370/230 |
| 2012/0106347 A1* | 5/2012 | Allan | ................ | H04L 12/4625 370/238 |
| 2014/0126422 A1* | 5/2014 | Bragg | ............... | H04L 12/462 370/255 |

* cited by examiner

*Primary Examiner* — Mohamed Kamara

(57) ABSTRACT

Methods, systems and computer readable media for default gateway redundancy support across SPB networks are described. In some implementations, the method can include enabling peer network information exchange on a per-network basis between a plurality of switches in a network and advertising a first address and a second address from each switch in the plurality of switches to the other switches. The method can also include storing, at each switch, the first address and the second address received from the other switches in the plurality of switches. The method can further include routing, at a first switch, traffic for a second switch when the first switch detects that the traffic can be routed more efficiently without being sent to the second switch.

15 Claims, 4 Drawing Sheets

100

DEFAULT GATEWAY REDUNDANCY SUPPORT ACROSS SPB NETWORKS

TECHNICAL FIELD

Embodiments relate generally to computer networks, and more particularly, to methods, systems and computer readable media for default gateway redundancy support across shortest path bridging (SPB) networks.

BACKGROUND

In some computer networks, when virtual machines and/or physical machines are moved to different locations, each respective gateway IP address may need to be updated or packets may take suboptimal paths during routing.

Routed split multi-link trunking (RSMLT) support may only provide default gateway redundancy only between two local peers and may not work across an SPB network. Further, the current RSMLT may support exchanges RSMLT IP and MAC addresses across an inter-switch trunk (IST) link only. The messages may not be exchanged across non-IST links.

Embodiments were conceived in light of the above mentioned needs, problems and/or limitations, among other things.

SUMMARY

One or more embodiments can include methods, systems and computer readable media for default gateway redundancy support across SPB networks. In some implementations, the method can include enabling peer network information exchange on a per-network basis between a plurality of switches in a network and advertising a first address and a second address from each switch in the plurality of switches to the other switches. The method can also include storing, at each switch, the first address and the second address received from the other switches in the plurality of switches. The method can further include routing, at a first switch, traffic for a second switch when the first switch detects that the traffic can be routed more efficiently without being sent to the second switch.

The first address can be an Internet Protocol address and the second address can be a MAC address. The peer network information exchange can include RSMLT or a standalone default gateway IP address and MAC address.

The method can also include starting a hold down timer when one of the switches is rebooted and forwarding traffic to a switch associated with the gateway for the traffic for the duration of the hold down timer. The first address and the second address received from the other switches in the plurality of switches as long as the advertising switch is reachable through the network. The network can include a shortest path bridging (SPB) network. The first address and the second address can correspond to a default gateway.

Some implementations can include a system comprising one or more processors configured to perform operations. The operations can include enabling peer network information exchange on a per-network basis between a plurality of switches in a network and advertising a first address and a second address from each switch in the plurality of switches to the other switches. The operations can also include storing, at each switch, the first address and the second address received from the other switches in the plurality of switches. The operations can further include routing, at a first switch, traffic for a second switch when the first switch detects that the traffic can be routed more efficiently without being sent to the second switch.

The first address can be an Internet Protocol address and the second address can be a MAC address. The peer network information exchange can include RSMLT or a standalone default gateway IP address and MAC address.

The operations can also include starting a hold down timer when one of the switches is rebooted and forwarding traffic to a switch associated with the gateway for the traffic for the duration of the hold down timer. The first address and the second address received from the other switches in the plurality of switches as long as the advertising switch is reachable through the network. The network can include a shortest path bridging network. The first address and the second address can correspond to a default gateway.

Some implementations can include a nontransitory computer readable medium having stored thereon software instructions that, when executed by a processor of a wireless controller, cause the processor to perform operations. The operations can include enabling peer network information exchange on a per-network basis between a plurality of switches in a network and advertising a first address and a second address from each switch in the plurality of switches to the other switches. The operations can also include storing, at each switch, the first address and the second address received from the other switches in the plurality of switches. The operations can further include routing, at a first switch, traffic for a second switch when the first switch detects that the traffic can be routed more efficiently without being sent to the second switch.

The first address can be an Internet Protocol address and the second address can be a MAC address. The peer network information exchange can include RSMLT or a standalone default gateway IP address and MAC address.

The operations can also include starting a hold down timer when one of the switches is rebooted and forwarding traffic to a switch associated with the gateway for the traffic for the duration of the hold down timer. The first address and the second address received from the other switches in the plurality of switches as long as the advertising switch is reachable through the network. The network can include a shortest path bridging network. The first address and the second address can correspond to a gateway.

DETAILED DESCRIPTION

In general, when virtual machines (VMs) are moved across datacenters, their default gateway addresses and IP addresses need not change. This can lead to suboptimal paths in the routing of packets as the gateway which had been servicing the routing may now be located somewhere other than where the VM has moved to.

In some implementations, for example, the gateway IP per VLAN is exchanged across all BEBs in an SPBm network. All BEBs where the VLAN is present can add the IP and MAC received from the ISIS LSDB from other BEBs and can install an ARP and MAC Forwarding Table entry, thereby routing for their own IPs as well as the IPs of the VLANs on other BEBs.

This approach can help provide optimal (or near optimal) routing paths when VMs move anywhere in the network without requiring intervention of network administrators to change gateway IPs.

Figure 1:
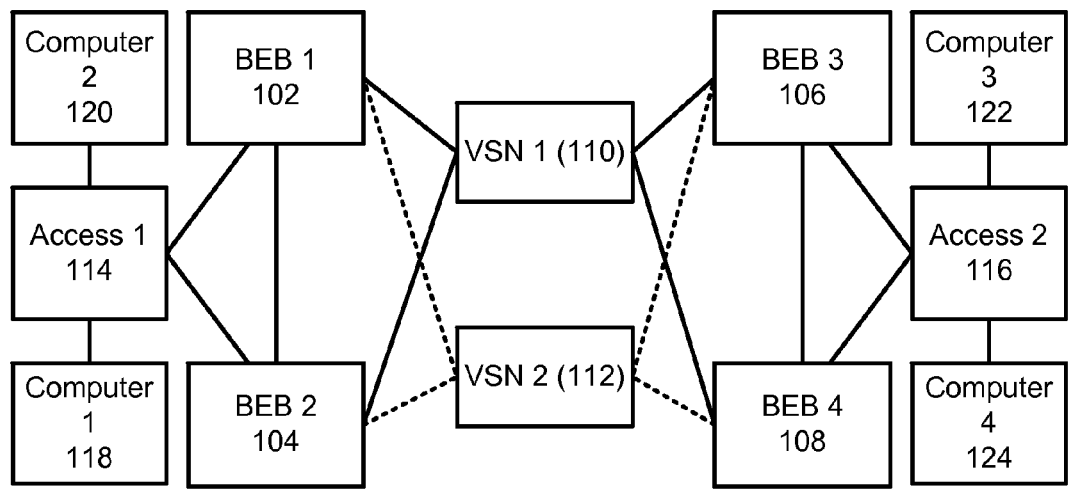
FIG. 1 is a diagram of an example network environment in accordance with at least one implementation.

FIG. 1 is a diagram of an example network environment 100 in accordance with at least one implementation. The network 100 includes four backbone edge bridges (BEBs) 102-108. The BEBs are connected in two pairs BEB 1 (102) and BEB 2 (104) are connected via an IST link, and BEB 3 (106) and BEB 4 (108) are connected via an IST link. The network includes two virtual service networks (VSNs) (110 and 112). An access switch 114 connects two computers (118 and 120) to the network. A second access switch 116 connects two other computers (122, 124) to the network.

Computer 1 (118) and computer 4 (124) are connected to VLAN 2, which is extended across the SPB network via VSN 2 (112). Computer 2 (120) and computer 3 (122) are connected to VLAN 1, which is extended across the SPB network via VSN 1 (110). In this example, VSN 1 (110) can have an ISID of 100 and VSN 2 (112) can have an ISID of 200.

Also, for purposes of this example, the following IP addresses and gateways are assigned. BEB 1 (102) has an RSMLT IP of 10.0.0.1 for VLAN 1 (110) and an IP of 20.0.0.1 for VLAN 2 (112). BEB 2 (104) has an RSMLT IP of 10.0.0.2 for VLAN 1 (110) and an IP of 20.0.0.2 for VLAN 2 (112). BEB 3 (106) has an RSMLT IP of 10.0.0.3 for VLAN 1 (110) and an IP of 20.0.0.3 for VLAN 2 (112). BEB 4 (108) has an RSMLT IP of 10.0.0.4 for VLAN 1 (110) and an IP of 20.0.0.4 for VLAN 2 (112).

Computer 1 (118) has an IP of 20.0.0.100 and a gateway address of 20.0.0.1. Computer 2 (120) has an IP of 10.0.0.100 and a gateway address of 10.0.0.1. Computer 3 (122) has an IP of 10.0.0.200 and a gateway address of 10.0.0.3. Computer 4 (124) has an IP of 20.0.0.200 and a gateway address of 20.0.0.3.

The BEBs (102-108) can learn the IP and MAC addresses for each other according to the method described below in connection with FIG. 3.

Figure 2:
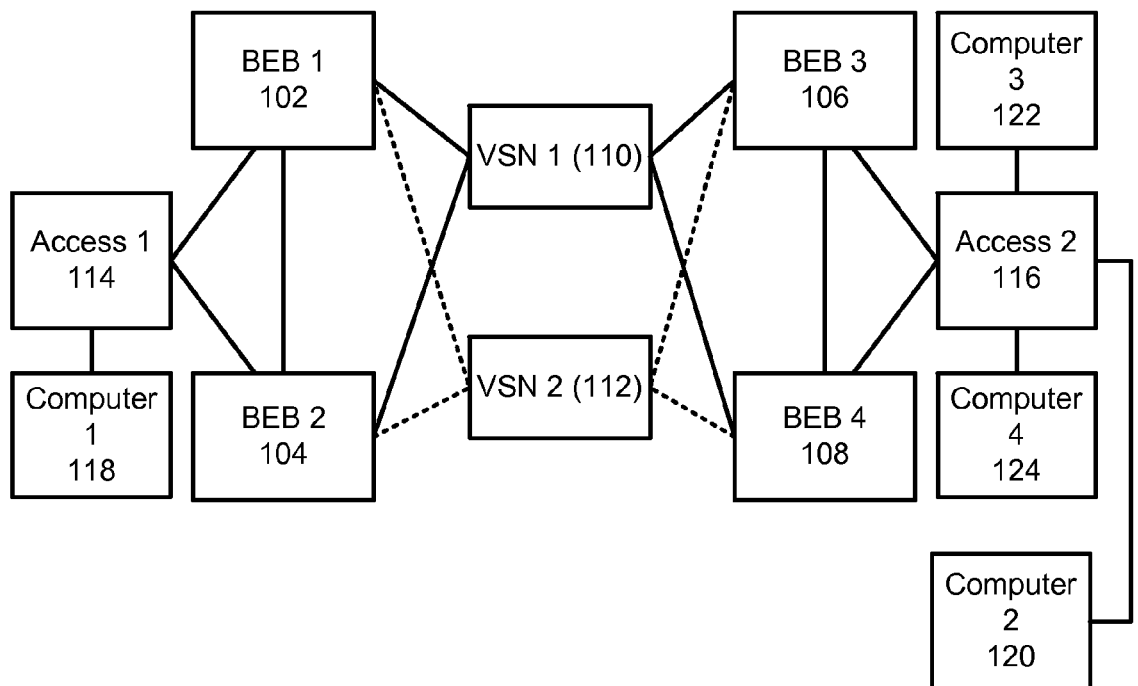
FIG. 2 is a diagram of an example network environment in accordance with at least one implementation showing a machine that has moved.

FIG. 2 is a diagram of an example network environment 200 showing a machine that has moved. In particular, Computer 2 (120) has been moved to connect with access switch 2 (116).

In conventional networks, packets from Computer 2 (120) would be forwarded to BEB 1 because the gateway for computer 2 (120) would remain as 10.0.0.1. However, in an implementation, because BEB 3 and BEB 4 have learned the RSMLT IP and MAC for BEB 1, each of BEB 3 and BEB 4 can route packets on behalf of BEB 1's IP of 10.0.0.1.

While a four BEB topology is shown in FIGS. 1 and 2 as an example, it will be appreciated that an implementation can be extended to as many switches (e.g., BEBs) as there are in a network and which have the "RSMLT over SPB" feature enabled.

Figure 3:
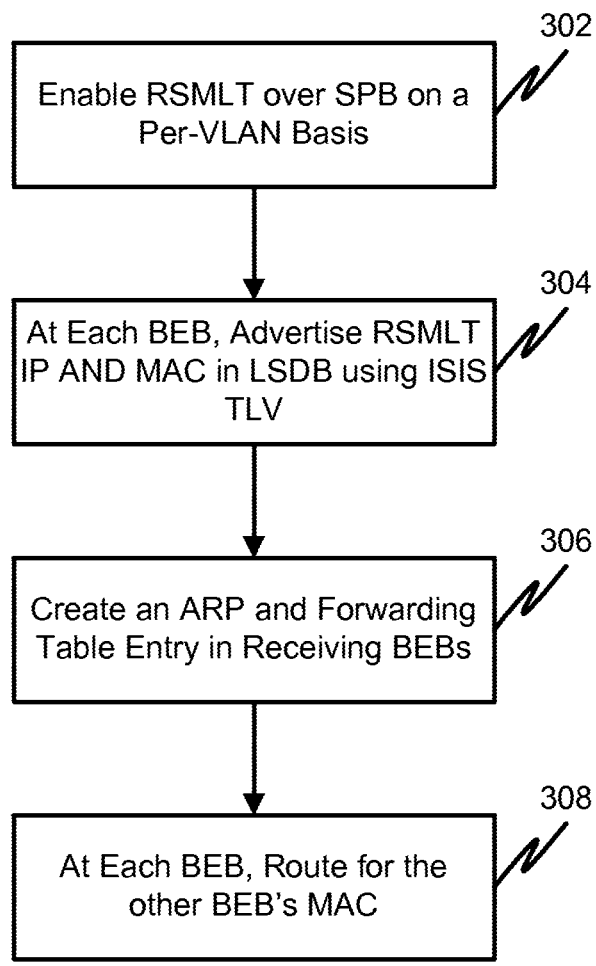
FIG. 3 is a flow chart of an example method for gateway support across SPB networks in accordance with at least one implementation.

FIG. 3 is a flow chart of an example method for gateway support across SPB networks in accordance with at least one implementation. Processing begins at 302, where RSMLT is enabled over an SPB (or SPBm) network on a per-VLAN basis. Processing continues to 304.

At 304, each BEB (e.g., 102-108) can advertise its respective RSMLT IP and corresponding MAC address in its LSDB using ISIS TLV. For example, BEB 1 (102) can advertise its RSMLT IP and corresponding MAC and BEB 2, BEB 3 and BEB 4 will get the information. BEB 2 does not need to act on the information as BEB 2 has already received BEB 1's information via the IST link. Processing continue to 306.

At 306, if RSMLT over SPB is enabled on BEB 3 and BEB 4, they will each create an ARP and a MAC FDB record in their respective forwarding tables for BEB 1's IP and MAC as routable. Processing continues to 308.

At 308, other switches (e.g., BEB 3 and BEB 4) can route any packets received with a destination MAC corresponding to a learned RSMLT IP and MAC (e.g., 10.0.0.1 for BEB 1).

In addition to the above steps, a hold down timer associated with RSMNLT can be used. For example, if BEB 3 is rebooted, when BEB 2 comes back up it will forward packets to the other switches (i.e., it won't route for the other BEBs) for the duration of the hold down timer.

A hold up timer may not apply for the RSMLT IP and MAC received via ISIS. For example, if BEB 3 were to go down, BEB 4 can continue to forward packets for BEB 1 because it already has the RSMLT IP and MAC for BEB 1.

Also, if BEB 1 were to go down or ISIS were disabled on it, then ISIS LSDB on BEB 3 and BEB 4 would expire after an expiration duration and BEB 3 and BEB 4 will remove the RSMLT IP and MAC corresponding to BEB 1.

Figure 4:
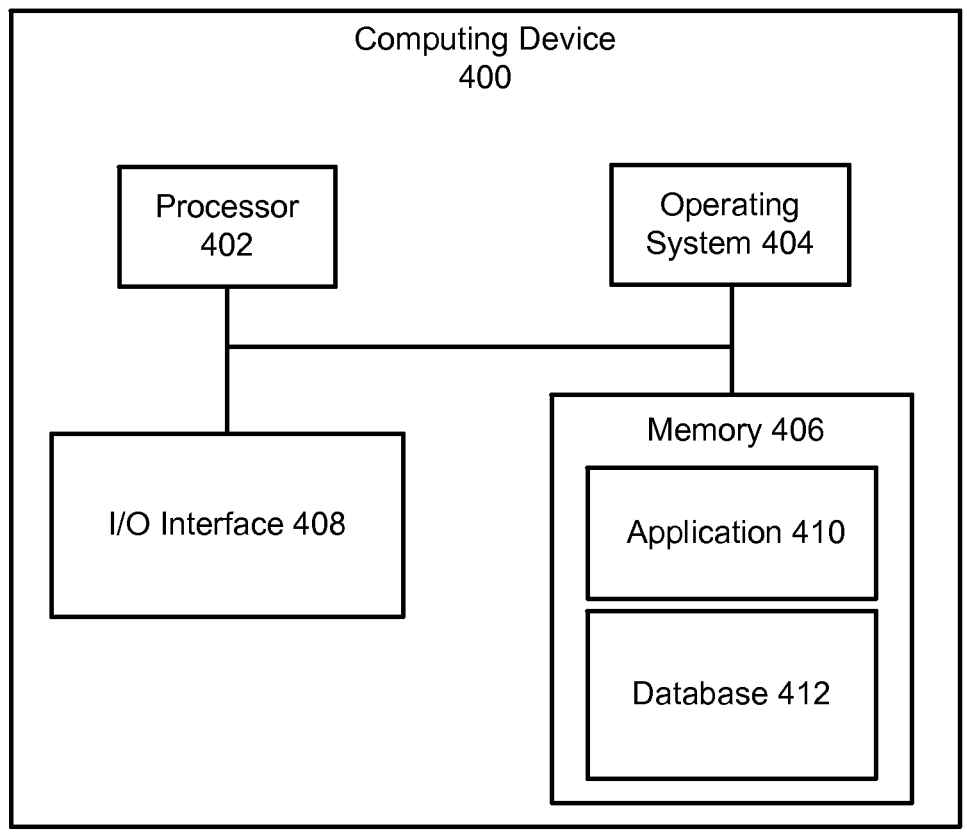
FIG. 4 is a diagram of an example computer system for multi-device single network sign-on in accordance with at least one implementation.

It will be appreciated that implementations can be extended to non-RSMLT topologies in which local VLAN IP and MAC addresses are advertised to remote BEBs on a per-VLAN basis FIG. 4 is a diagram of an example computer system 400 in accordance with at least one implementation. The computer 400 includes a processor 402, operating system 404, memory 406 and I/O interface 408. The memory 406 can include a default gateway redundancy support application 410 and a database 412 (e.g., for storing information such as RSMLT IP and MAC addresses, or the like).

In operation, the processor 402 may execute the application 410 stored in the memory 406. The application 410 can include software instructions that, when executed by the processor, cause the processor to perform operations for default gateway redundancy support across SPB networks in accordance with the present disclosure (e.g., performing one or more of steps 302-308).

The application program 410 can operate in conjunction with the database 412 and the operating system 404.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer, workstation, router, switch or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for default gateway redundancy support across SPB networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
    enabling peer network information exchange via routed split multi-link trunking (RSMLT) over shortest path bridging (SPB) including non-inter switch trunk (IST) links on a per-network basis between a plurality of switches in a shortest path bridging mac-in-mac network;
    advertising a first address and a second address from each switch in the plurality of switches to the other switches via RSMLT over SPB;
    storing, at each switch, the first address and the second address received from the other switches in the plurality of switches; and
    routing, at a first switch, traffic for a second switch when the first switch detects that the traffic can be routed more efficiently through the shortest path bridging mac-in-mac network without being sent to the second switch.

2. The method of claim 1, wherein the first address is an Internet Protocol address and the second address is a MAC address.

3. The method of claim 1, further comprising:
    starting a hold down timer when one of the switches is rebooted; and
    forwarding traffic to a switch associated with the gateway for the traffic for the duration of the hold down timer.

4. The method of claim 1, wherein the first address and the second address received from the other switches in the plurality of switches are stored as long as an advertising switch associated with the first address and the second address is reachable through the network.

5. The method of claim 1, wherein a protocol used for the advertising is ISIS.

6. The method of claim 1, wherein the first address and the second address correspond to a gateway.

7. A system comprising one or more processors configured to perform operations including:
    enabling peer network information exchange via routed split multi-link trunking (RSMLT) over shortest path bridging (SPB) including non-inter switch trunk (IST) links on a per-network basis between a plurality of switches in a shortest path bridging mac-in-mac network;
    advertising a first address and a second address from each switch in the plurality of switches to the other switches via RSMLT over SPB;
    storing, at each switch, the first address and the second address received from the other switches in the plurality of switches; and routing, at a first switch, traffic for a second switch when the first switch detects that the traffic can be routed more efficiently through the shortest path bridging mac-in-mac network without being sent to the second switch.

8. The system of claim 7, wherein the first address is an Internet Protocol address and the second address is a MAC address.

9. The system of claim 7, wherein the operations further comprise:
   starting a hold down timer when one of the switches is rebooted; and
   forwarding traffic to a switch associated with the gateway for the traffic for the duration of the hold down timer.

10. The system of claim 7, wherein the first address and the second address received from the other switches in the plurality of switches are stored as long as an advertising switch associated with the first address and the second address is reachable through the network.

11. The system of claim 7, wherein the first address and the second address correspond to a gateway.

12. A nontransitory computer readable medium having stored thereon software instructions that, when executed by a processor of a wireless controller, cause the processor to perform operations including:
   enabling peer network information exchange via routed split multi-link trunking (RSMLT) over shortest path bridging (SPB) including non-inter switch trunk (IST) links on a per-network basis between a plurality of switches in a shortest path bridging mac-in-mac network;
   advertising a first address and a second address from each switch in the plurality of switches to the other switches via RSMLT over SPB;
   storing, at each switch, the first address and the second address received from the other switches in the plurality of switches; and
   routing, at a first switch, traffic for a second switch when the first switch detects that the traffic can be routed more efficiently through the shortest path bridging mac-in-mac network without being sent to the second switch.

13. The nontransitory computer readable medium of claim 12, wherein the first address is an Internet Protocol address and the second address is a MAC address.

14. The nontransitory computer readable medium of claim 12, wherein the operations further comprise:
   starting a hold down timer when one of the switches is rebooted; and
   forwarding traffic to a switch associated with the gateway for the traffic for the duration of the hold down timer.

15. The nontransitory computer readable medium of claim 12, wherein the first address and the second address received from the other switches in the plurality of switches are stored as long as an advertising switch associated with the first address and the second address is reachable through the network.

* * * * *